(12) United States Patent
Liscano

(10) Patent No.: US 7,966,423 B2
(45) Date of Patent: Jun. 21, 2011

(54) INTERNET APPLIANCE PROXY PROTOCOL TO SUPPORT LOCATION-BASED SERVICES

(75) Inventor: Ramiro Liscano, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 1312 days.

(21) Appl. No.: 10/759,249

(22) Filed: Jan. 20, 2004

(65) Prior Publication Data

US 2004/0148438 A1 Jul. 29, 2004

(30) Foreign Application Priority Data

Jan. 20, 2003 (GB) .................................. 0301285.3

(51) Int. Cl.
G06F 15/16 (2006.01)
(52) U.S. Cl. ......................... 709/246; 709/223; 709/225
(58) Field of Classification Search .................... 705/26; 709/218, 246; 455/422.1
See application file for complete search history.

(56) References Cited

U.S. PATENT DOCUMENTS

| | | | | |
|---|---|---|---|---|
| 5,713,018 A * | 1/1998 | Chan | ............................... | 707/10 |
| 6,167,449 A * | 12/2000 | Arnold et al. | ................. | 709/227 |
| 6,219,696 B1 * | 4/2001 | Wynblatt et al. | ............... | 709/218 |
| 6,473,621 B1 * | 10/2002 | Heie | ............................. | 455/466 |
| 6,517,587 B2 * | 2/2003 | Satyavolu et al. | ......... | 715/501.1 |
| 6,542,933 B1 * | 4/2003 | Durst et al. | ................... | 709/229 |
| 6,732,178 B1 * | 5/2004 | Van Horne et al. | ........... | 709/227 |
| 6,738,808 B1 * | 5/2004 | Zellner et al. | ................. | 709/223 |
| 6,865,608 B2 * | 3/2005 | Hunter | .......................... | 709/229 |
| 6,931,007 B2 * | 8/2005 | Jones | ........................... | 370/392 |
| 6,981,146 B1 * | 12/2005 | Sheymov | ...................... | 713/172 |
| 7,068,655 B2 * | 6/2006 | March et al. | ................... | 370/392 |
| 7,133,506 B1 * | 11/2006 | Smith | ......................... | 379/88.25 |
| 2002/0048283 A1 * | 4/2002 | Lin | ............................... | 370/495 |
| 2002/0120779 A1 * | 8/2002 | Teeple et al. | ................... | 709/246 |
| 2003/0008640 A1 * | 1/2003 | Lansio et al. | ................. | 455/414 |
| 2003/0028513 A1 * | 2/2003 | Pawar | .............................. | 707/1 |
| 2003/0070077 A1 * | 4/2003 | Redlich et al. | ............... | 713/182 |
| 2003/0120775 A1 * | 6/2003 | York | .............................. | 709/224 |
| 2003/0149746 A1 * | 8/2003 | Baldwin et al. | ............... | 709/219 |
| 2003/0204573 A1 * | 10/2003 | Beck et al. | .................... | 709/218 |
| 2004/0019613 A1 * | 1/2004 | Jones et al. | ................... | 707/200 |
| 2004/0054789 A1 * | 3/2004 | Breh et al. | .................... | 709/229 |
| 2004/0123148 A1 * | 6/2004 | Offermann | .................... | 713/201 |
| 2004/0193676 A1 * | 9/2004 | Marks | ........................... | 709/203 |

FOREIGN PATENT DOCUMENTS

| | | |
|---|---|---|
| EP | 1 126 681 A2 | 8/2001 |
| EP | 1122654 A2 | 8/2001 |
| WO | WO 0122766 A1 | 3/2001 |
| WO | WO 02/11474 A2 | 1/2002 |

OTHER PUBLICATIONS

Microsoft. Microsoft Computer Dictionary. 2002. Microsoft Press. 5th Ed. p. 335.* What is Session Initiation Protocol. [online]. [retrieved on Jun. 22, 2007] Retrieved from <url: http://searchvoip.techtarget.com/sDefinition/0,290660,sid66_gci541639,00.html>.*
Frederik Ternelius: "SIP, NAT, and Firewalls—Master's Thesis" HTTP://WWW.CS.COLUMBIA.EDU/SIP/DRAFTS/THER005_SIP.PDE, May 2000, pp. 1-69, XP002330402.
Perkins, C (Editor): "IP Mobility Support, 1-16 RFC 2002", RFC2002, Oct. 1996, XP002233555 (54 pgs.).

* cited by examiner

*Primary Examiner* — Aaron Strange

(57) ABSTRACT

A method for providing location and contact information about a user to a location-based service includes sending a request containing substitutable variables via an Internet portal. The Internet portal replaces the variables, en-route to the message's destination, thus eliminating the need for the location-based service to further query the Internet portal for the data, or for the data to be available to the sender when the message is sent.

10 Claims, 2 Drawing Sheets

INTERNET APPLIANCE PROXY PROTOCOL TO SUPPORT LOCATION-BASED SERVICES

FIELD OF THE INVENTION

This invention relates in general to Internet messaging protocols, and more specifically to a text-based messaging protocol enabling location-based service applications to efficiently collect local information from a network portal by triggering the portal to replace substitutable variables in messages from $3^{rd}$ party applications with the local information.

BACKGROUND OF THE INVENTION

An Internet Appliance is a device such as a telephone, refrigerator or stove that, while dedicated to its inherent function, is also connected to the Internet via a network. Typically, an Internet Appliance supports applications that require data from the Internet Appliance to be passed on to another service on the Internet. For example, a particular service might require an Internet Appliance telephone to provide its directory number so it could be used to forward calls. As another example, a different service might require an Internet Appliance CD player identification code so that a particular driver for the CD player could be updated. Since Internet Appliances may behave also as portals to the Internet for $3^{rd}$ party applications, it is useful to have the Internet Appliances provide local information for the $3^{rd}$ party applications to the service provider.

An example of a service that benefits from receiving such local information is a Location-based service.

Location-based services are those that leverage information about a user's environment in order to enhance a service. Such information may describe a physical location, but more generally will be identification information describing the network portal. Some further location-based services are described below:

A presence service leverages location information to project to other users of the system how to contact a person. Such contact information is a description of a service and address that can be used by a presence client to initiate a communication session between 2 or more users. When a person changes locations, and they wish to signal their new location using presence, they will send a request to a presence server using a portal.

In a manner similar to the presence service, a personal assistance service requires portal information to facilitate, for instance, "Call Forwarding" capabilities.

A monitoring service can also take advantage of location information provided by, for instance, a telephone Internet Appliance as a portal. By mapping a telephone directory number to a physical room number it is possible to track users in a hospital or office building, for instance.

There are three ways in which $3^{rd}$ party applications now take advantage of local Internet Appliance portal information.

The first approach is to have the Internet Appliance contain an application designed to respond to custom requests from a $3^{rd}$ party. For example, an Internet Appliance telephone might understand a Forward Call request from a $3^{rd}$ party application and will respond to it by requesting from the user an identification code in order that it may process the request. However, this particular approach has been found to be somewhat inflexible because it requires that the Internet Appliance manufacturer work closely with the application developers to implement all of the custom requests that are desired.

The second approach is to have the $3^{rd}$ party application first request information from the Internet Appliance and then compose a further request to the service provider using the data received from the first request. This approach is somewhat of an improvement on the first approach because it provides an application developer reasonable flexibility and the Internet Appliance manufacturer need only let the application developer know what information the Internet Appliance will provide. However, because of the two-step communication process, this approach is not particularly efficient. In addition, this approach requires that two separate communication channels be established between the third party application and the Internet Appliance: one to query the Internet Appliance and the other to communicate with the service provider.

The third approach is to have the application request the Internet Appliance to act on its behalf to perform a request to the service provider. An example of this approach is the use of the SIP REFER method. A "referror" (the third-party application) causes the "referee" (the Internet Appliance portal) to perform the SIP request to the service provider on its behalf. In performing the request, the "referee" confers its own information to the service provider. However, this approach imposes a limit on the type of information that the portal can pass on to the service provider, leaving the $3^{rd}$ party application unable to control the type or nature of the information sent to the service provider. Further information on the SIP protocol can be found in SIP: Session Inititation Protocol, IETF SIP Working Group Draft, October 2001, Rosenberg, Schulzrinne, Camarillo, Johnston, Peterson, Sparks, Handley and Schooler.

It is an objective of an aspect of the present invention to provide an improvement to the way local information can be extracted from Internet Appliance portals for use by location-based services.

SUMMARY OF THE INVENTION

According to the present invention, local information is provided to a service provider by having the Internet Appliance portal augment $3^{rd}$ party application requests to the service provider using local information. Thereby eliminated is the need for the $3^{rd}$ party application or user to supply local information, to have the portal further queried for local information, or to be limited to the type of local information gleaned from having requests made on behalf of the $3^{rd}$ party applications by the portal.

A message-initiating device sends a message containing substitutable variables and destined for a particular network address first to an Internet portal. The portal scans the message for substitutable variables and replaces them with local information. The network portal passes the augmented message to the service provider.

BRIEF DESCRIPTION OF THE DRAWINGS

A detailed description of the preferred embodiment is set forth in detail below, with reference to the following drawings, in which.

DETAILED DESCRIPTION

Figure 1:
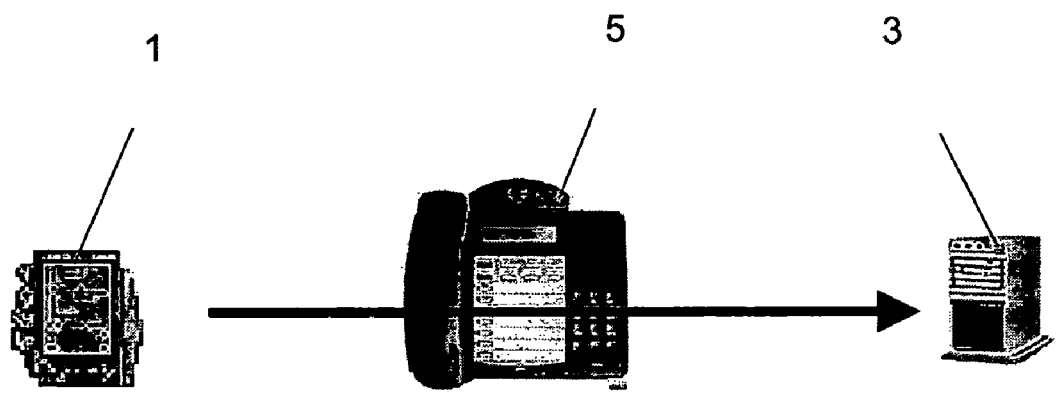
FIG. 1 shows message flow in the preferred embodiment of the invention from a PDA through an Internet Appliance telephone, where it is augmented with local information and then passed to the service provider.

According to the present invention in its most general aspect, an Internet Appliance is provided that has a pass-through messaging capability with one-way variable replacement. The command or request message is sent to the intended recipient and the Internet Appliance need not interpret the contents of the message. Instead, the Internet Appliance unpacks the message, replaces the variables that it supports with actual values, and passes the message to its intended recipient.

The message itself is preferably formatted according to a text-based messaging protocol. However, for the purposes of this invention, the message need not be text-based. Any protocol decipherable by an Internet Appliance is sufficient that enables, in combination with a suitably chosen variable naming scheme and format, the Internet Appliance to determine where in a message it should substitute local information, what pieces of information it should use for substituting, and to what destination an amended message should be sent.

This aspect of the invention may be illustrated by way of the following example, in which HTTP is the protocol. An HTTP request typically comprises a Request Line, a Request Header, and the Message Body. The Request Line specifies the HTTP method that is being used for the request, such as the GET or POST methods.

An HTTP GET operation is typically used to request data from a server based on arguments sent with the request. In an HTTP GET request the parameter information is specified in an http_URL, as defined below:

http_URL ="http:" "//" host [ ":" port ] [ abs_path [ "?" query ]]

where:
host=IP_address
port=IP_port_number
abs_path=absolute_path_name
query=a list of variable names "=" variable values separated by commas According to the invention, certain query variables are formatted as Internet Appliance Variables in a manner such that the portal will be triggered upon receipt of the request to exchange the variables with local information:

query=InternetApplianceVar

Preferably, the Internet Appliance Variable is formatted as follows:

InternetApplianceVar = "!PORTAL-"VarName"!"
VarName =1*ALPHA

The key expressions on which the Internet Appliance's algorithm triggers are the starting exclamation (!) and the string "PORTAL-". Further, using this format, the VarName variable name must be followed by an ending exclamation (!). This Internet Appliance Variable format is effective because it does not conflict with the schemas of HTTP and SIP URLs.

When an HTTP or SIP message is sent, the Internet Appliance portal checks for the occurrence of the Internet Appliance Variables in the message to determine if it can resolve the VarName with a particular value. It does this by matching the VarName to a variable of the same name internal to the is portal. The next paragraphs will describe in greater detail implementations that are dependent on particular protocols.

In an example using HTTP, the GET request:
http://www.mitel.ca/presence/register?phone=!PORTAL-dn!

when sent to its destination via an Internet Appliance telephone portal will trigger the telephone portal to exchange the HTTP query Internet Appliance Variable (!PORTAL-dn!) with its directory number (dn).

The HTTP Post method is more challenging than a GET request because the accompanying arguments may be sent in any desired MIME (Multipurpose Internet Mail Extensions) format. POST operations are typically used to submit information on a completed HTML form to an application server. In such cases, variables in the form are typically identified in the header as Content-Type: application/x-www-form-urlencoded as shown below in a POST example. The user could choose an option on the form that would specify the user's contact point as the directory number of whichever portal is currently being used to connect to the network.

The HTML form is created to contain an Internet Appliance Variable, as shown in the example below, that must be detected and replaced with a "real" value by an Internet Appliance:

```
POST /path/script.cgi HTTP/1.0
    From: abcd@mitel.com
    User-Agent: HTTPTool/1.0
    Content-Type: application/x-www-form-urlencoded
    Content-Length: 33
    name=Cosby&forward-to=!PORTAL-dn!
```

Furthermore, in this situation, the Internet Appliance is required to change the Content-Length after replacing "PORTAL-dn!" with its corresponding "real" value.

This invention is applicable also to POSTED information encoded in XML. For example, a presence infrastructure might use XML encoding for describing resources that a user wishes to be contacted on. If a mobile user wished to send this information over a phone portal the user would acquire the phone directory number (DN) according to this invention by POSTING the following XML document.events. One such type of event involves a registration procedure that includes sending contact information in the following manner:

```
<resource_profile id='desktop phone' active='active'>
    <media service='telephony' provider='MITEL' protocol='MITAI'
    address='!PORTAL-dn!' args=''/>
</resource_profile >
```

A further example follows in which the IETF Session Initiation Protocol (SIP) is used. SIP has a clearly defined mechanism by which users can register their appearance to a SIP proxy. This SIP proxy maintains the real location of a user based on a mapping from a user URI to a device URL. The common mechanism to do this requires a functional device with a user agent that sends the registration request to a registrar that communicates with a location server that a SIP proxy can use to lookup the real location of a user. Typically, with this particular approach it is not possible to use a third party device, like a PDA, to register the user on the portal device because such a device would be able only to request that the registrar perform the registration without being able to supply its location information. However, with this invention a user can use a stimulus Internet Appliance telephone portal and a functional device, like a PDA, to effectively register the user with the phone set.

Since SIP messages are formatted similarly to HTTP messages, the procedure followed for variable replacement is much the same. The Internet Appliance portal would search the SIP header for recognised Internet Appliance variables. Such variables would typically be located in the CONTACT header field of the SIP message as shown below:

```
Contact: "Mr. Watson" <sip:!PORTAL-SIPAddr!>
        "Mr. Watson" <tel:!PORTAL-dn!>
        "Mr. Watson" <mailto:watson@bell-telephone.com>
```

Upon detecting recognised Internet Appliance variables, the Internet Appliance would replace them with corresponding "real" values.

Turning now to FIG. 1, there is shown the preferred embodiment of the invention in which a message from a 3$^{rd}$ party application on a PDA 1 is sent to a presence service-provider 3 via an Internet Appliance telephone 5. The message is formatted as an XML document, following the CPIM (Common Profile for Instant Messaging) message format, and is communicated to a presence server 3 using one of the SIP or HTTP protocols. Absent an Internet Appliance variable, the message is of the form:

```
<presence>
    <tuple name="phone">
        <status>
            <value>open</value>
        </status>
        <contact>tel:09012345678</contact>
    </tuple>
</presence>
``` where:
"phone" is the service type;
"tel:09012345678" is the contact address; and
"open" is the availability.

According to the present invention, the above message, instead of containing an actual contact address, contains an Internet Appliance variable, as shown below:

```
<presence>
    <tuple name="phone">
        <status>
            <value>open</value>
        </status>
        <contact>tel:!PORTAL-DN!</contact>
    </tuple>
</presence>
```

Figure 2:
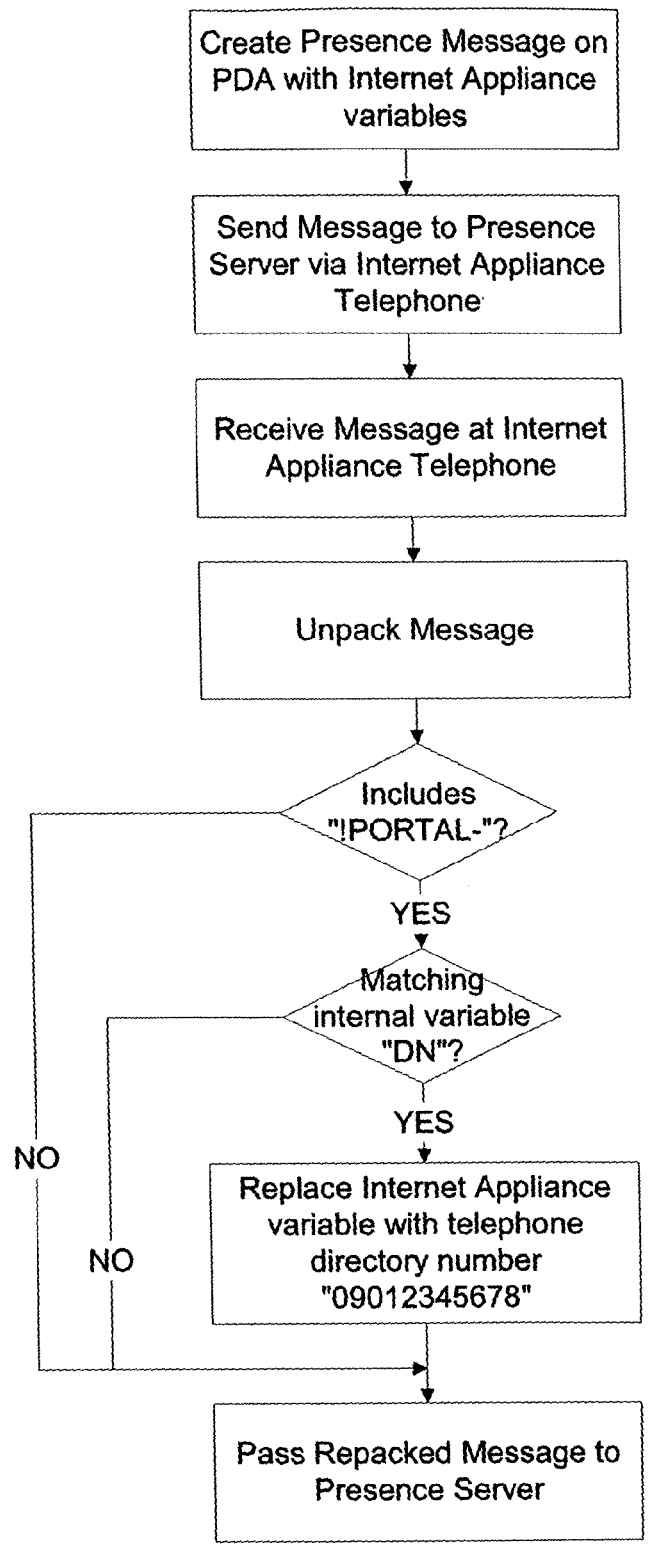
FIG. 2 is a flowchart illustrating the steps involved in the augmentation of a message according to the preferred embodiment, in which the message is created on and sent from a PDA via an Internet Appliance telephone to a presence server.

Turning now to the flowchart of FIG. 2, the Internet Appliance telephone 5 receives the above message, and is triggered by the occurrence of "!PORTAL-" to find a matching variable name (DN) internally. If able to find a match, it replaces "!PORTAL-DN!" in the message with its corresponding local value which, in this case, is the value "09012345678". It then passes the amended message to the service provider 3.

Additional advantages of the invention are that an Internet Appliance portal need only support one application, and Internet Appliance portal manufacturers need only make known the Internet Appliance variables supported by their device. A 3$^{rd}$ party application developer is therefore reasonably free to develop various applications that leverage the portal without having to make requests directly to the portal. Furthermore, a 3$^{rd}$ party application developer would already be accustomed to using HTTP or SIP requests and would need only to insert Internet Appliance variables into such requests.

A person understanding the present invention may conceive of alternatives and variations thereof.

Firstly, a skilled person will appreciate that the invention may be applied to any text-based Internet protocol. For example, using the Simple Mail Transfer Protocol (SMTP) a text-based email message may be sent via an Internet Appliance portal such that the portal captures the Internet Appliance variables and replaces them with its corresponding internal values.

All such embodiments and variations are believed to be within the sphere and scope of the invention as defined by the claims appended hereto.

What is claimed is:

1. A method of operating an Internet Appliance having a network portal configured to provide a local information of said Appliance to a destination server, said local information being an actual real value to identify said Appliance, comprising:
   prior to receiving a request message, storing in a memory of said Appliance at least one value representative of said Appliance local information in association with a respective variable name;
   receiving at said Appliance said request message containing a substitutable variable name and addressed to said destination server;
   detecting said substitutable variable name in said request message;
   matching said substitutable variable name with one of said value representations stored in said memory;
   replacing said substitutable variable name in said request message with said matched value representation of said Appliance local information from said memory, thereby creating an amended message; and
   sending said amended message to said destination server.

2. The method of claim 1 wherein said message and said amended message are formatted to a text-based Internet protocol.

3. The method of claim 2, wherein said text-based Internet protocol is Hypertext Transfer Protocol.

4. The method of claim 2, wherein said text-based Internet protocol is Session Initiation Protocol.

5. The method of claim 2, wherein said text-based Internet protocol is Simple Mail Transfer Protocol.

6. An Internet Appliance comprising a network portal configured to provide a local information of said Appliance to a destination server, said local information being an actual real value to identify said Appliance, comprising:
   a memory comprising at least one value representative of said Appliance local information in association with a respective variable name and said value representative being stored prior to receipt of a request message;
   a receiver for receiving said request message, said request message addressed to said destination server and consisting partly of a substitutable variable name;
   means for identifying said substitutable variable name and matching said substitutable variable name with said value representation stored in said memory;
   a processor for replacing said substitutable variable name in said request message with the value representative of said Appliance local information from said memory, thereby creating an amended message; and
   a transmitter for sending said amended message to said destination server.

7. The network portal of claim 6 wherein said message and said amended message are formatted to a text-based Internet protocol.

8. The network portal of claim 7, wherein said text-based Internet protocol is Hypertext Transfer Protocol.

9. The network portal of claim 7, wherein said text-based Internet protocol is Session Initiation Protocol.

10. The network portal of claim 7, wherein said text-based Internet protocol is Simple Mail Transfer Protocol.

* * * * *